Patented July 30, 1946

2,404,791

UNITED STATES PATENT OFFICE 2,404,791

VINYL POLYMERS

Donald D. Coffman and Frank C. McGrew, Wilmington, Del., assignors to E. I. du Pont de Nemours & Company, Wilmington, Del., a corporation of Delaware No Drawing. Application January 23, 1942, Serial No. 427,946

4 Claims. (Cl. 260—88)

This invention relates to vinyl polymers and more particularly to a new process for obtaining them. Many methods for the polymerization of vinyl compounds are known, but none is entirely satisfactory. The polymerization of vinyl halides presents special difficulties apparently due to the relative sluggishness of the monomers in polymerization reactions. For example, although vinyl chloride can be polymerized more rapidly in emulsion than in any other physical state, the most effective systems known heretofore, produce only very slow polymerization at moderate temperatures such as up to 45° C. It is not feasible to overcome this difficulty by increased temperatures, since the most suitable products, for many purposes, are those which are prepared at 45° C. or below. As a consequence, vinyl chloride polymerization by the methods of the art is limited in practice to a slow, uneconomical process which cannot be applied effiiciently to production on a large scale.

This invention has as its object to provide a method for polymerizing vinyl halides with extreme rapidity. Another object is to provide a practical and efficient process for the extremely rapid polymerization of vinyl chloride at moderate temperatures. Still another object is to provide a practical and efficient process for the copolymerization of vinyl halides with other substances capable of polymerization at an extremely rapid rate. Another object is to provide a method of vinyl halide polymerization in which polymerization catalysts insoluble in organic media could be used with maximum effectiveness. Other objects will be apparent from the following description of the invention.

These objects are accomplished by the following invention which comprises polymerizing the polymerizable components of an emulsion of a vinyl halide either alone or in admixture with, at least, one polymerizable unsaturated compound in an aqueous medium having pH of at least about 10, and containing a dissolved salt of perdisulfuric acid and a dispersing agent selected from the group consisting of

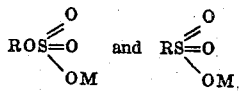

wherein R is an acyclic hydrocarbon of 12 to 18 carbon atoms and M is an alkali metal, said polymerization being carried out with an oxygen-free atmosphere over said emulsion.

The exact manner of practicing this invention will vary depending upon the compounds polymerized, and the catalyst and dispersing agent selected; however, the following will illustrate its application.

An aqueous medium which contains about 1% of a perdisulfate salt and about 1-5% of a dispersing agent such as a long chain primary alcohol sulfate or sulfonate is adjusted to a pH of 10.5 by the addition of dilute caustic. This medium is then placed in a pressure vessel capable of withstanding the pressures developed by heating vinyl chloride (ca. 5-10 atmospheres), followed by about one-half its weight of vinyl chloride. Atmospheric oxygen is then removed from the vessel by any suitable means, e. g., by flushing with nitrogen, providing the contents are chilled below the boiling point of vinyl chloride. The vessel is then sealed and agitated at 45° C. until polymerization is complete as indicated by a nearly complete loss of internal pressure due to vinyl chloride. This usually requires 2 to 3 hours.

The following examples, in which the parts are given by weight, further illustrate the practice of the invention and demonstate by several series of systematic comparisons, the critical importance of the elements of the invention in obtaining rapid polymerization.

EXAMPLE I

A series of aqueous solutions are prepared which are identical in every respect except that each solution contains a different oxygen-liberating compound. The proportions of the oxygen-liberating compounds used in the individual solutions (see Table I below) are such that the solutions contain equimolecular amounts, based on the oxygen-liberating capacity of the compounds. In addition to this component, each solution contains the following ingredients: Nine parts of a sulfonated mineral oil dispersing agent containing 30 to 35% active ingredient, which is essentially identical to that described in Example III of U. S. Patent No. 2,197,800, 180 parts of water, and sufficient 5% potassium hydroxide solution to bring the solution to a pH of 10.5, as determined by a glass-electrode pH-meter. The quantity of alkali required varies according to the ingredients of the solution but is usually less than 5 parts. These solutions are then placed in a series of identical pressure vessels, each having a capacity of about 6 times the volume of the aqueous solution. The vessels are cooled to −50° C., and about 100 parts of vinyl chloride is introduced into each. Air is removed from the containers by thorough flushing with nitrogen. Each is then sealed and connected to a shaking apparatus so devised that the vessels are immersed in a water bath maintained at a constant temperature of 45° C. After allowing 15 minutes for the temperature of the vessels and their contents to rise to 45° C., which produces an internal pressure of about 100 lbs./sq. in., the agitation is begun. The polymerization is arrested at the end of two hours by removing and opening the vessels. Since unchanged vinyl chloride readily escapes, the polymer present is easily isolated by filtering the residual aqueous suspension. The yield of polymer obtained, which is a direct indication of the rate of polymerization, is correlated in Table I with the oxygen-liberating compound employed. The unique superiority of perdisulfates as promoters of vinyl chloride polymerization under the conditions used is clearly evident.

scribed in Example I. The yields of polymer present at the end of this time are tabulated in Table II as functions of the dispersing agent and pH employed. The rapid polymerization attained by the use of the selected class of dispersing agents of this invention contrast sharply with the lower polymerization rates produced by other agents. The critical importance of the pH of the aqueous phase is also evident from these data.

TABLE II
Relative efficacies of dispersing agents and the influence of pH on the rapid emulsion polymerization of vinyl chloride

| Dispersing agent, nature | Proportion of active ingredient, percent | Amount used, parts | Yield of polyvinyl chloride (%) obtained at various pH's | | | | | | | | | |
|---|---|---|---|---|---|---|---|---|---|---|---|---|
| | | | pH 1.5 | pH 2.5 | pH 3.5 | pH 5.5 | pH 8.5 | pH 9.5 | pH 10.0 | pH 10.5 | pH 11.5 | pH 12.5 |
| Dispersing agents falling within the scope of this invention: | | | | | | | | | | | | |
| Sodium hexadecyl-1 sulfate | 100 | 3 | | 69 | | 45 | 89 | 90 | 95 | 97 | 98 | 90 |
| Sodium salt of reaction product of cetyl alcohol and chlorosulfonic acid | 22 | 13 | 3 | | | 26 | 70 | 72 | 80 | 81 | 88 | |
| Sodium salt of reaction product of oleyl alcohol and chlorosulfonic acid | 33 | 9 | 3 | 9 | | | 31 | 58 | 87 | 69 | | 65 |
| Sodium salt of sulfonated white oil | 30-35 | 9 | 40 | 56 | 47 | 43 | 67 | 69 | 78 | 85 | 86 | |
| Sodium hexadecane-1-sulfonate | 100 | 3 | | 13 | | | | | 63 | 79 | 93 | |
| Other type of dispersing agents: | | | | | | | | | | | | |
| Sodium salt of reaction product of oleyl acetate and chlorosulfonic acid | 30 | 10 | | 29 | | 1 | 0 | | | 14 | | |
| Sodium salt of reaction product of polymerized benzyl chloride and chlorosulfonic acid | 10.6 | 28 | | | | | | | | 0 | | |
| Sodium tetrahydronaphthalene sulfonate | 98 | 3 | | | | | | | | 8 | | |
| Sodium oleate | 100 | 3 | | | | | | | | 0 | | |
| Polyvinyl alcohol | 100 | 3 | | | | | | | | 0 | | |
| Turkey red oil | 100 | 3 | | | | | | | | 3 | | |

TABLE I
Relative efficacies of perdisulfates and other oxygen-liberating compounds as catalysts for emulsion polymerization of vinyl chloride

| Promoter | Equivalent weight (based on oxygen-liberating capacity) | Parts used | Polyvinyl chloride yield, per cent of theory |
|---|---|---|---|
| Perdisulfates: | | | |
| Ammonium perdisulfate | 114 | 1.02 | 85 |
| Potassium perdisulfate | 135 | 1.26 | 91 |
| Sodium perdisulfate | 119 | 1.06 | 93 |
| Other oxygen-liberating compounds: | | | |
| Hydrogen peroxide | 17 | 0.15 | 0 |
| Benzoyl peroxide | 121 | 1.08 | 3 |
| Sodium perborate monohydrate | 50 | 0.45 | 3 |
| Calcium peroxide | 36 | 0.32 | 5 |
| Dodecanoyl peroxide | 199 | 1.75 | 4 |
| Ammonium perphosphate | 139 | 1.17 | 7 |

EXAMPLE II

A number of aqueous polymerization media are prepared, each comprising a solution of 1.02 parts of ammonium perdisulfate dissolved in 180 parts of water. In adding dispersing agent, the media are divided into groups, each group containing a different agent and each solution in the same group containing the same agent. The surface-active agents, which usually contain inert materials such as solvents, etc., are added to the solutions in such amounts that each solution contains an equal weight of the active ingredient. Each individual solution is then treated with sufficient 5% aqueous potassium hydroxide or 2% hydrochloric acid to produce a certain desired pH (in the range 1.5 to 12.5) as indicated in Table II. Each of these solutions, in an airfree pressure vessel containing 100 parts of vinyl chloride, is shaken for 2 hours at 45° C. as described in Example I.

EXAMPLE III

Five identical polymerization mixtures are prepared and placed in pressure vessels as described in Example I. Each mixture consists of 3 parts of sodium tetradecyl sulfate, 180 parts of water, 1 part of ammonium perdisulfate, sufficient potassium hydroxide solution to produce a pH of 11.2, and 100 parts of vinyl chloride. One of the containers is exhausted of air before being charged so that the gaseous space in it is filled with vinyl chloride vapor. One each of the pressure vessels is flushed with nitrogen, oxygen, and methane, respectively, while the fifth is allowed to remain filled with air. The vessels are shaken at 40° C. for four hours and are then vented. The polymer yields obtained and the gases present are correlated in Table III. These results demonstrate that a tremendous acceleration of the polymerization rate is attained by the exclusion of atmospheric oxygen.

TABLE III
Comparison of operable and inoperable gaseous constituents of emulsion systems for the rapid polymerization of vinyl chloride

| Gas | Yield of polyvinyl chloride, per cent |
|---|---|
| Operable: | |
| Nitrogen | 78 |
| Methane | 72 |
| Vinyl chloride | 74 |
| Inoperable: | |
| Air | 0 |
| Oxygen | 0 |

EXAMPLE IV

A series of polymerization mixtures are introduced into polymerization vessels. Each mixture comprises water (185 parts), ammonium perdisulfate (1 part), sulfonated hydrocarbon dispersing agent referred to in Example I (9 parts), vinyl chloride (85 parts), one of the interpolymerization ingredients listed in Table IV below (15 parts), and sufficient dilute hydrochloric acid to produce a pH of 2.5. A second series of mixtures is prepared which is identical in every respect except that potassium hydroxide solution is added to bring each mixture to a pH of 10.5. The air in the polymerization vessels is then displaced with nitrogen. The vessels are closed and shaken for two hours at 45° C. The yield of polymer produced in each mixture is given in Table IV. On the basis of these results, it is apparent that the high pH (10.5) promotes more rapid interpolymerization of vinyl chloride with other polymerizable compounds.

TABLE IV

*Advantage of high pH in securing rapid interpolymerization of vinyl chloride with other polymerizable compounds*

| Interpolymerization ingredient (present to the extent of 15%) | Yields obtained in 2 hours at 45° C., per cent | | Proportionate increase of rate given by pH 10.5 |
|---|---|---|---|
| | At pH 2.5 | At pH 10.5 | |
| Asymmetrical dichloroethylene | 10 | 29 | 190 |
| Methyl methacrylate | 7 | 10 | 43 |
| Acrylonitrile | 16 (4 hrs.) | 22 (4 hrs.) | 37 |
| Methyl vinyl ketone | 14 (4 hrs.) | 15 (4 hrs.) | 7 |
| Diethyl fumarate | 16 (4 hrs.) | 27 (4 hrs.) | 69 |

The invention is generic to the polymerization of vinyl halides, especially vinyl fluoride, vinyl chloride, and vinyl bromide. Among these compounds vinyl chloride is polymerized most satisfactorily by the process of this invention, and is preferred. As indicated in Example IV, the process is also applicable to the polymerization of vinyl halides in the presence of other materials which contain one ethylenic bond capable of vinyl polymerization. This provides a uniquely effective means of obtaining interpolymers of vinyl halides with the following substances: Acrylic esters, including methyl and ethyl acrylates, chloroacrylic esters, methacrylic esters, especially methyl methacrylate, asymmetrical dichloroethylene, methyl vinyl ketone, acrylonitrile, methacrylonitrile, and fumaric and maleic esters. The process of the present invention cannot be applied to interpolymerization mixtures containing vinyl esters of organic acids; these esters are so sensitive to alkaline hydrolysis that it is impossible to produce and maintain a pH of 10 or higher in their presence. With regard to interpolymerization, the invention is chiefly concerned with mixtures of polymerizable compounds which consist of at least 50% by weight of vinyl halides. In the preferred embodiment, vinyl halides comprise at least 80% of the mixture of materials to be polymerized.

The operability of the invention is not confined to any particular relation as regards proportion of vinyl compound and proportion of aqueous media. For the most economical use of the accessory components, however, it is usually preferred to use an amount of vinyl compound of at least $\frac{1}{10}$ the weight of the aqueous medium. It is also helpful in maintaining an emulsion if the proportion of organic to aqueous phases is not greater than 1:1 by weight.

As is self-evident from the description of the invention as an emulsion process, it is essential to have two immiscible phases, which must be intimately mixed in order to achieve rapid polymerization. An operable emulsion, in general, is one in which a plurality of the discreet portions of the organic material (i. e., droplets) are too small to be seen with the naked eye. A satisfactory emulsion may be secured in a number of ways. For example, many emulsions of vinyl chloride in water are stable during the time required for polymerization, if the mixtures are initially agitated for a few minutes. The dispersing agents operable in this invention are in general especially useful in forming stable emulsions which, after they are once formed, need not be agitated throughout the reaction. It has, however, been found that polymerization occurs more rapidly in certain emulsions while they are being agitated. It is accordingly preferred to assist the dispersing agent in maintaining the emulsion by mechanical means, for example, by stirring or shaking, which may or may not be continuous.

As is evident from Example II, the pH of the aqueous medium is a critical factor in promoting rapid polymerization. It is to be noted especially that the rate of polymerization increases markedly between pH 9.5 and pH 10, and that the rates obtained if the pH is at least 10 are still more remarkably superior to those achieved in lower pH regions. This invention encompasses polymerizations carried out in systems having a pH of at least 10 and preferably below 12. Media having pH's considerably above 10 are to be avoided because of their effect upon the product. Thus, at pH's above 12, and particularly above 12.5, the caustic concentration is sufficiently high to cause undesirable degradation of the polyvinyl chloride formed. It is believed that this degradation takes the form of abstraction of the elements of hydrogen chloride from the polymer molecules accompanied by partial neutralization of the alkaline hydroxide of the media, since the pH in such instances is observed to fall during the period of contact of the polymer with the aqueous media. As a practical result of this phenomenon, it is difficult to maintain a pH above 12 when polyvinyl chloride is present. Consequently, it is preferred to conduct the process of this invention at a pH between 10 and 12.

The polymerization initiators encompassed by this invention include the water-soluble salts of perdisulfuric acid. In addition to the ammonium and alkali metal salts disclosed in the examples, there may also be used the lithium, barium, magnesium and calcium perdisulfates. While the water-soluble alkaline earth metal salts are operable, they are usually not employed because of their tendency to precipitate the corresponding alkaline earth hydroxide at high pH's. For these reasons, the preferred salts are the ammonium and alkali metal salts. Among them the alkali metal salts frequently produce somewhat superior results, while ammonium perdisulfate is preferred on account of its considerably lower cost.

The concentration of perdisulfate salt employed may be varied within wide limits. For instance, in proportions relative to the quantity of monomer employed, amounts of perdisulfate salts varying from 0.1% to 10% are operable. In respect to economy of catalyst, quality of product, and rapidity of polymerization, the preferred proportion of perdisulfate salt lies in the range of 0.25 to 4% based on the weight of monomer.

As operable dispersing agents in addition to those disclosed in the foregoing examples, there may be mentioned the alkali metal salts of the following long chain alkyl sulfates and sulfonates: Dodecyl-1 acid sulfate, tetradecyl-1 acid sulfate, hexadecyl-1 acid sulfate, octadecyl-1 acid sulfate, oleyl-1 acid sulfate, dodecane-1-sulfonic acid, tetradecane-1-sulfonic acid, hexadecane-1-sulfonic acid and octadecane-1-sulfonic acid. The salts of long chain sulfonated paraffin oil hydrocarbons are especially effective dispersants and need be employed only in small proportions to achieve the desired results. It will be understood that the dispersants to which reference is made above are commercial materials which, because of the methods used in their manufacture and because of the sources of the starting materials, are usually not produced in high state of purity and contain minor constituents which influence the effectiveness of the active ingredient. Polymerization systems containing such ancillary ingredients, which are present adventitiously or added deliberately, are recognized as part of this invention. These ingredients, which are useful only when an operable dispersant is also present, may include inorganic salts, long chain primary alcohols, carbohydrate derivatives, polyvinyl alcohol, etc.

To a limited extent there is a direct relationship between the rate of polymerization and the quantity of dispersing agent present. Thus, while the outstanding superiority of the operable dispersing agents, as shown in Example II, is manifested in aqueous concentrations of the active ingredient of about 1.5%, still more rapid polymerization can be effected under otherwise identical conditions if the active dispersing agent ingredient is present to the extent of 3 to 5%. Conversely, it is observed that active ingredient concentrations (based on the weight of the aqueous phase) as low as 0.2% are associated with somewhat less rapid polymerization. Still lower concentrations of dispersing agent reduce the rate of polymerization considerably. Using the rate of polymerization as a criterion, the invention encompasses active ingredient concentrations of 0.2 to 5%. Within this range the preferred concentration will in general depend upon the proportion of monomer present, but is usually from 0.5 to 3%. For example, if an amount of monomer equal to the quantity of aqueous phase is employed, it will be most satisfactory to use the higher of the preferred dispersing agent concentrations. Conversely, if, for example, only ⅕ this amount of monomer is present, the lower preferred concentration will be optimum. From the standpoint of economy and the ease of removing the dispersing agent from the polymerized product, it is customary to use approximately the smallest amount of dispersing agent which promotes the rate of polymerization desired.

It may also be pointed out that the efficacy of the dispersing agent, especially if small concentrations are employed, is enhanced by agitating the mixture. It should be emphasized that the dependence of the efficiency of the dispersing agents upon the active ingredient concentration and agitation in no way oppugns the sharp distinction previously noted between the dispersing agents operable in this invention and those which are not. Thus, with most of the inoperable dispersing agents, it is impossible to obtain the rapid rate of polymerization characteristic of the operable agents either by most vigorous agitation or by the use of concentrations as high as the solubility of the material will permit. Even in instances where such modifications of systems involving inoperable dispersing agents permit sufficient acceleration of the polymerization rate, the process is not practicable because of the expense and the operating difficulties entailed by the use of very high proportions of dispersing agent.

It is an essential element of this invention that the polymerization mixture be substantially free of gaseous oxygen. Specifically, it is necessary to reduce the oxygen content in the gas phase of the vessel employed to 1% or less. At oxygen contents below this point polymerization will proceed but is inhibited to an extent approximately proportional to the oxygen concentration. In order to achieve the rate of polymerization characteristic of this invention in its preferred form the oxygen content of the gas phase should be reduced to 0.1% or less. To this end it is unnecessary that dissolved oxygen be removed from the liquid ingredients of the reaction mixture since the amount of oxygen involved is too small to be significant. It is important, however, to displace the air normally present in the gas phase with a non-inhibiting gas. This may be done in a number of ways as illustrated in Example III.

As is well known, the dependence of the rate of vinyl polymerization upon the temperature is very important, and low temperatures cannot usually be used because the corresponding rate of reaction is impracticably low. The present invention can be operated at any temperature above the freezing point of the aqueous phase which is somewhat below 0° C. Preferably, the polymerization is conducted at temperatures between 20° C., below which the reaction is too slow to be useful for most purposes, and 80° C., above which the product is adversely affected by the medium.

The pressure employed in the process is usually that generated by vinyl chloride at the temperature employed. Higher pressures, such as may be obtained by forcibly introducing a gaseous diluent such as nitrogen, are also operable and in some cases desirable. The process is not limited to any particular apparatus. It is necessary only that a vessel be employed from which oxygen can be excluded which is able to withstand the pressures developed by the heated monomer. Various mechanical means may be used to mix the contents if mixing is desired. For example, the polymerization vessel may be shaken or tumbled. It is also possible and usually more satisfactory when operating on a large scale to mix the contents by means of a mechanical stirrer. In the operation of a continuous polymerization process, the agitation is suitably provided by passing the ingredients through a centrifugal pump. The operating technique is not limited to the procedure used in the foregoing examples. For instance, instead of cooling the polymerization vessel before adding the ingredients, it is often equally suitable and sometimes preferred to introduce the monomer at the temperature at which polymerization is to be conducted. The monomer is thus usually introduced as a gas under pressure, and may be added continuously or portionwise throughout the course of the reaction.

In addition to the necessary constituents of the polymerization mixture in this process as described in the foregoing, it is also possible to add other desired ingredients. For example, there may be introduced various substances which have the ability to soften, plasticize, or stabilize the final product.

The utility of the process of this invention centers in the remarkably rapid rate of polymerization which it produces. It is especially useful in effecting polymerization at a practicable rate at relatively low temperatures, which are often preferred because of the desirably high molecular weight of the product produced thereby. Even at higher operating temperatures where less efficient polymerization processes produce moderately rapid polymerization, the process of this invention is uniquely useful. For example, its characteristic very high rate of reaction facilitates polymerization by a continuous procedure which results in an enormous saving of operating equipment and a minimum of difficulty.

As many apparently widely different embodiments of this invention may be made without departing from the spirit and scope thereof, it is to be understood that this invention is not to be limited to the specific embodiments shown and described.

We claim:

1. A process for obtaining a resinous material which consists in emulsifying a vinyl halide in an aqueous medium wherein the ratio of aqueous to non-aqueous phase ranges from 10:1 to 1:1 by weight and having a pH within the range of 10 to 12, said medium containing from 0.1% to 10%, based on the weight of the vinyl halide, of a dissolved salt of perdisulfuric acid and from 0.2% to 5%, based on the weight of the aqueous phase, of a dispersing agent from the group consisting of

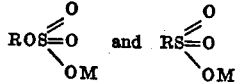

wherein R is an acyclic hydrocarbon of 12 to 18 carbon atoms and M is an alkali metal, and polymerizing the resulting emulsion at a temperature ranging from 0° C. to 80° C., while maintaining an inert, gaseous, oxygen-free atmosphere over said emulsion.

2. A process for obtaining a resinous material which consists in emulsifying vinyl chloride in an aqueous medium wherein the ratio of aqueous to non-aqueous phase ranges from 10:1 to 1:1 by weight and having a pH within the range of 10 to 12, said medium containing from 0.25% to 4%, based on the weight of the vinyl chloride, of a dissolved salt of perdisulfuric acid and from 0.2% to 5%, based on the weight of the aqueous phase, of a dispersing agent from the group consisting of

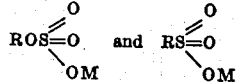

wherein R is an acyclic hydrocarbon of 12 to 18 carbon atoms and M is an alkali metal, and polymerizing the resulting emulsion at a temperature ranging from 20° C. to 80° C., while maintaining an inert, gaseous, oxygen-free atmosphere over said emulsion.

3. The process in accordance with claim 2 characterized in that the pH of the aqueous medium is about 10.5.

4. A process for obtaining a resinous material which consists in emulsifying vinyl chloride in an aqueous medium, wherein the ratio of aqueous to non-aqueous phase is 1:1 by weight and having a pH within the range of 10–12, said medium containing from about 0.25%–4%, based on the weight of the vinyl chloride, of ammonium perdisulfate, and from 0.5%–3%, based on the weight of the aqueous phase, of a salt of a long-chain alkyl sulfonate as a dispersing agent, and then polymerizing the resulting emulsion by maintaining the same at a temperature ranging from about 20–80° C., while in contact with an atmosphere of nitrogen until polymerization becomes complete.

DONALD D. COFFMAN.
FRANK C. McGREW.